United States Patent [19]

Bernard et al.

[11] Patent Number: 4,925,908

[45] Date of Patent: May 15, 1990

[54] ACRYLIC BASED EMULSION POLYMERS

[75] Inventors: Margaret Bernard, La Verne; Stansliv Berman, Granada Hills, both of Calif.

[73] Assignee: Avery International Corporation, Pasadena, Calif.

[21] Appl. No.: 131,819

[22] Filed: Dec. 11, 1987

[51] Int. Cl.$^5$ .................. C08F 220/04; C08F 220/26; C08F 220/56; C09J 7/02
[52] U.S. Cl. ..................... 526/320; 428/355; 524/157; 524/158; 524/161; 524/325; 524/555; 524/559; 524/560; 524/801; 524/831; 524/832; 526/307.5; 526/307.6; 526/307.7; 526/317.1; 526/318.2; 526/318.3; 526/318.4; 526/318.41; 526/318.42; 526/318.43; 526/321; 526/323.1
[58] Field of Search ..................... 526/317.1, 324, 320, 526/323.1, 318.41, 318.42, 321, 318.2, 307.5, 307.6, 307.7, 318.3, 381.4, 318.43; 428/355

[56] References Cited

U.S. PATENT DOCUMENTS

| | | |
|---|---|---|
| 2,884,126 | 4/1959 | Ulrich et al. . |
| 3,475,363 | 10/1969 | Gander et al. . |
| 3,922,464 | 11/1975 | Silver et al. . |
| 3,971,766 | 7/1966 | Ono et al. .............................. 526/250 |
| 3,988,392 | 10/1976 | Kameda et al. ......................... 525/85 |
| 3,992,485 | 11/1976 | Kosugi et al. .......................... 525/288 |
| 4,110,290 | 8/1978 | Mori et al. ............................ 428/520 |
| 4,204,023 | 5/1980 | Witt . |
| 4,456,734 | 6/1984 | Lindner et al. ........................ 525/309 |
| 4,629,663 | 12/1986 | Brown et al. . |
| 4,645,711 | 2/1987 | Winslow et al. . |
| 4,716,194 | 12/1987 | Walker et al. ......................... 525/100 |
| 4,751,269 | 6/1988 | Bonk et al. ............................ 428/355 |

Primary Examiner—Herbert J. Lilling
Attorney, Agent, or Firm—Christie, Parker & Hale

[57] ABSTRACT

A removable pressure sensitive adhesive composition comprises an acrylic-based emulsion polymer having a gel content of from about 70 to about 90% comprises about 90 to 99.5 parts alkyl acrylate monomers, up to about 2 parts polar monomers and up to about one part of a multifunctional acrylate monomer.

11 Claims, No Drawings

ACRYLIC BASED EMULSION POLYMERS

FIELD OF THE INVENTION

This invention relates to acrylic-based emulsion polymers having a gel content of from about 70% to about 90% for use in pressure-sensitive adhesive compositions.

BACKGROUND OF THE INVENTION

Removable pressure-sensitive adhesives are used on a variety of products including labels, tapes and the like to enable the product to adhere to a substrate and then later be removed from the substrate without difficulty and without leaving a stain or residue. To be suitable for such applications, the pressure-sensitive adhesive must have good adhesion with low peel strength and must not exhibit a significant increase in adhesion over time. Optimally, the pressure-sensitive adhesive should exhibit such physical properties on a variety of substrates.

One commercially available removable pressure-sensitive adhesive is an acrylic emulsion polymer which has poor mandrel performance and exhibits excessive adhesion buildup on some substrates over time. The product also performs only at a narrow coat weight range of 18 to 20g/m$^2$ and tends to be expensive.

Another commercially available removable pressure-sensitive adhesive is a formulated rubber composition which, over time, tends to phase separate. This results in edge ooze, face bleed and, on some substrates, excessive adhesion buildup. This formulation can only be coated at low speeds and the convertibility is poor.

One attempt to improve the performance of removable pressure-sensitive adhesives formed by acrylic emulsions involved the blending of two commercial polymers mixed with fillers and ionic crosslinkering agents. This formulation, however, suffered from incompatibility as shown by two different glass transition temperatures. In addition, the adhesive left stains on certain substrates.

Accordingly, there is a need for a removable pressure sensitive adhesive which demonstrates good adhesion and removability properties over a long period of time and on a wide variety of substrates.

SUMMARY OF THE INVENTION

The present invention provides a removable pressure-sensitive adhesive (PSA) composition which, when coated onto a support, e.g., label stock such as high gloss paper and electronic data processing paper, provides low peel adhesion on a variety of substrates without significant adhesion buildup over time.

The PSA composition comprises acrylic-based emulsion polymers having a gel content of from about 70 to about 90 percent and a swell ratio of from about 15 to about 25. The polymers comprise from about 90 to about 99.5 parts of alkyl acrylate monomers having from 1 to about 12 and preferably from about 4 to about 8 carbon atoms in the alkyl chain. The polymers further comprise up to about two parts of a polar monomer such as methacrylic acid, and up to about one part of a multifunctional acrylate monomer.

The PSA composition preferably comprises one or more adhesion stabilizers including a protective colloid in an amount up to about 1 percent by weight of the monomers and a plasticizer in an amount of up to about 3 percent by weight of the monomers.

The polymer is preferably synthesized in the presence of a combination of anionic and non-ionic emulsifiers or surfactants which form part of the PSA composition. The total amount of anionic and non-ionic emulsifiers is not more than about 4.0 percent by weight of the monomers and preferably not more than about 3.7 percent by weight. The ratio of anionic emulsifier to non-ionic emulsifier is greater than one. The amount of anionic emulsifier is from about 1.5 to about 3 percent by weight of the monomer and the amount of non-ionic emulsifier is from about 0.5 to about 2 percent by weight of the monomers.

DETAILED DESCRIPTION

In accordance with the present invention, there is provided a removable pressure-sensitive adhesive (PSA) composition comprising acrylic-based emulsion polymers. The removable PSA composition, when coated onto facestock to form a label or the like, exhibits low peel adhesion, preferably on the order of about 50 to about 300 N/m on stainless steel, and does not experience significant increase in peel adhesion with time and/or temperature.

The acrylic-based emulsion polymers comprise from about 90 to about 99.5 parts, i.e. percent by weight, and preferably about 98 parts alkyl acrylate monomers. Amounts less than about 90 parts alkyl acrylate in the polymer tends to lower the qel content and raise the glass-transition temperature (Tg), resulting in poor removable properties. Polymers having more than about 99.5 parts alkyl acrylate tend to have insufficient cohesive strength and leave stains or residue when peeled away from certain substrates.

The alkyl acrylate monomers preferably have from 1 to about 12 carbon atoms in the alkyl chain and more preferably most of the alkyl acrylate monomer comprises from about 4 to about 8 carbon atoms in the alkyl chain. The lower alkyl acrylates, i.e. those having 1 to 3 carbon atoms in the alkyl chain, are not preferred as they tend to affect adhesion properties of the PSA composition, i.e., impart too low of an adhesion, on at least some substrates. Homopolymers of alkyl acrylates having more than 12 carbon atoms in the alkyl chain, tend to be crystalline and are not preferred. However, non-crystalline copolymers including aklyl acrylates having more than 12 carbon atoms in the alkyl chain may be used as desired.

Accordingly, polymers in which at least the majority of the alkyl acrylate monomers have from about 4 to about 8 carbon atoms in the alkyl chain are presently preferred as providing the optimum balance of hardness, adhesion and removability. Exemplary preferred alkyl acrylates suitable for use in the present invention include 2-ethylhexyl acrylate, butyl acrylate, heptyl acrylate, octyl acrylate, isooctyl acrylate and isobutyl acrylate. 2-ethylhexyl acrylate is presently preferred.

If, the polymer contains less than about 97 or 98 parts alkyl acrylate monomers, it is preferred that the polymer further comprise up to about 10 parts of any other monomer such as vinyl acetate or the like.

In addition to the alkyl acrylate monomer, the acrylic-based emulsion polymers comprise up to about 2 parts of one or more polar monomers such as methacrylic acid, acrylic acid, itaconic acid, maleic acid, or acrylamide. The polar monomers impart mechanical stability and cohesive strength of the polymer.

The polymers of the present invention further comprise up to about one part and preferably from about 0.1 part to about 0.3 part of at least one multifunctional acrylate monomer. Including the multifunctional acrylate monomers enables the desired gel contents of the polymer to be obtained. That is, without the multifunctional acrylate monomer, the gel content of the polymer tends to be too low. For most polymer formulations, the multifunctional acrylate monomer must be present in an amount of at least about 0.1 percent to obtain the desired gel content.

It has been found that the amount of multifunctional acrylate monomer should not exceed about one percent as such amounts tend to reduce the stability of the acrylic-based emulsion from which the polymers are prepared, resulting in coagulation of the emulsion particles during preparation. Amounts of the multifunctional acrylate monomer above about 0.3 percent are not preferred as no additional benefit, i.e. no additional increase in gel content is typically observed. Examples of suitable multifunctional acrylates include polyethylene glycol diacrylate, hexane diol diacrylate, ethoxylated trimethylpropane triacrylate, pentaerythritol triacrylate and polypropylene glycol diacrylate. Hexane diol diacrylate is presently preferred.

An initiator induces polymerization of the monomers. Any suitable initiator may be used. Preferred initiators include peroxides and peroxydisulfates. The initiator is preferrably present in an amount of about 0.1 percent to about 0.2 percent of the monomer weights. The presently preferred initiators are potassium persulfate and the t-butyl hydroperoxide, particularly in combination with each other in a ratio of from about 1:1 to about 1:3. Such combinations are preferred as they tend to provide optimum control of the rate of initiation and of the percentage conversion, i.e. the amount of polymer formed at a given time.

The acrylic-based emulsion polymers of the present invention have a gel content of from about 70 to about 90 percent by weight and preferably from about 75 to about 83 percent. As used herein, "gel content" refers to the percentage by weight of the polymer that is insoluble in tetrahydrofuran, toluene or other similar organic solvent.

It has been found that acrylic-based emulsion polymers having a gel content of less than about 70 percent tend to exhibit too much adhesion, particularly upon aging, and hence are not suitable for applications requiring a removable adhesive. Polymers having a gel content of more than about 90 percent tend to exhibit too little adhesion and hence are too removable for most applications.

Acrylic-based emulsion polymers having gel contents below about 75 percent and above about 83 percent are not preferred because such polymers tend to exhibit too much or too little adhesion respectively on certain substrates. Acrylic-based emulsion polymers having a gel content of from about 75 to about 83 percent are presently preferred as they tend to exhibit the desired amount of adhesion and removability on most substrates, including polar, non-polar and porous substrates. Exemplary substrates include polyethylene, polypropylene, fiberglass, appliance enamel, glass, formica, manila tags and recycled corrugated cardboard.

The acrylic-based emulsion polymers further comprise a swell ratio of from about 15 to about 25 and preferably from about 18 to about 23. As used herein, "swell ratio" refers to the amount of organic solvent, specifically tetrahydrofuran, which a polymer can absorb without dissolving. For example, a swell ratio of 15 indicates that one gram of polymer can absorb 15 grams of solvent without dissolving.

The swell ratio provides an indirect evaluation of the cross-linking density of the polymers. A swell ratio above about 25 is not preferred because it tends to indicate insufficient crosslinking which results in the polymer having too much adhesion on at least some substrates. A swell ratio below about 15 is also not preferred as it tends to indicate too much crosslinking which typically results in too little adhesion on at least some substrates.

While not critical, it is preferred that the glasstransition temperature (Tg) of the polymers be in the range from about $-30°$ C. to about $-60°$ C. and preferably from about $-50°$ C. to about $-55°$ C. It has been found that PSA compositions having a Tg from about $-30°$ C. to about $-60°$ C. and particularly from about $-50°$ C. to about $-55°$ C. exhibit the desired amount of tack, i.e. initial adhesion.

The soluble portion weight average molecular weight of the polymers is also not critical, but is preferably at least about 200,000. It has been found that polymers having a soluble portion weight average molecular weight of less than about 200,000 tend to exhibit too much adhesion and insufficient cohesive strength, resulting in residues being left on a substrate after removal of the PSA composition.

In addition to the acrylic-based emulsion polymers, the removable PSA composition preferably comprises one or more adhesion stabilizers to minimize peel adhesion buildup over time and/or with elevated temperatures. Preferred adhesion stabilizers include one or more plasticizers and one or more protective colloids.

The plasticizer may be present in an amount of up to about 3 percent by weight based on the total weight of the monomers and is preferably present in an amount from about 1 percent to about 3 percent by weight.

Amounts below about 1 percent by weight are not preferred as the PSA compositions tend to exhibit insufficient removability on certain substrates, e.g. polypropylene and formica, particularly upon aging. However, for certain substrates, e.g. glass, a plasticizer need not be present. It is preferred that the plasticizer not exceed about percent because the polymers tends to exhibit a reduction in shear properties and the PSA composition tends to exhibit insufficient adhesion on certain substrates, e.g. glass, and hence is too removable from those substrates.

Any suitable plasticizer may be used. Preferred plasticizers are monomeric plasticizers including dialkyl esters of dibasic acids such as dioctyl phthalate and dioctyl azelate. The presently preferred plasticizer is dioctyl azelate.

A protective colloid, also known in the art as a steric stabilizer, is preferably present in the PSA composition in an amount of up to about 1 percent by weight of the monomers and preferably from about 0.5 percent to about 1 percent by weight of the monomers. Compositions having less than about 0.5 percent by weight of the protective colloid are not preferred because such compositions tend to exhibit too great of an adhesion buildup on some substrates. For certain substrates, e.g. glass, the protective colloid need not be present in the composition. If present, it is preferred that the amount not exceed about 1 percent by weight because such compositions tend to exhibit too little adhesion and hence are too removable for some substrates.

Any suitable protective colloid may be used. The presently preferred protective colloid is a high molecular weight polyvinyl alcohol composition sold by Air Products under the trade name Vinol 540. This product is approximately 87 to 89% hydrolyzed, i.e. polyvinyl acetate which has undergone about 89% hydrolysis to form polyvinyl alcohol, and has, according to the manufacturer, a molecular weight of about 105,000 to about 110,000. Other suitable protective colloids are believed to include polyethylene oxide and hydroxy ethyl cellulose.

To obtain emulsion polymers having the above parameters, it has been found that the particle size of the acrylic-based emulsion from which the polymers are synthesized should not exceed about 210 nm. Such a particle size tends to stabilize the emulsion without decreasing the gel content of the polymerized product.

It has also been determined that the preparation of acrylic-based emulsion polymers having a gel content of from about 70 to about 90 percent with the desired peel adhesion requires the monomers to be polymerized in the presence of a combination of anionic and non-ionic emulsifiers or surfactants.

The synthesis of the polymers in the presence of an anionic emulsifier alone was found to yield polymers with high gel content without coagulation but also with undesirably high peel adhesion and hence resulted in polymers that were insufficiently removable for the desired applications. It was further determined that the addition of a non-ionic emulsifier in combination with an anionic emulsifier reduced the peel adhesion of the polymers to the desired levels. The presence of a non-ionic emulsifier, however, tended to increase the particle size of the emulsion.

Accordingly, to maintain the desired parameters, the total amount of anionic and non-ionic emulsifiers is preferably maintained below about 4.0 percent by weight and more preferably below about 3.7 percent by weight based on the weight of the monomers. Emulsions having more than about 3.7 percent by weight emulsifiers and particularly more than about 4.0 percent by weight emulsifiers tend to have a reduced stability, e.g. undergo coagulation, and hence are not preferred.

The amount of anionic emulsifier should be from about 1.5 to about 3.0 percent by weight and preferably from about 1.8 to about 2.1 percent by weight based on the weight of the monomers. When less than about 1.5 percent by weight anionic emulsifier is used, the emulsion tends to lose stability resulting in coagulation of the emulsion particles.

The amount of non-ionic emulsifiers should be in the range of from about 0.5 to about 2.0 percent by weight and preferably from about 1.3 to about 1.7 percent by weight based on the weight of the monomer. Again, when less than about 0.5 percent non-ionic emulsifier is used, the emulsion tends to lose stability.

It has also been found that the weight ratio of anionic emulsifier to non-ionic emulsifier should be greater than 1. That is, the amount of anionic emulsifier should exceed the amount of non-ionic emulsifier. If the ratio is below 1, the gel content tends to be low and the particle size of the emulsion tends to be high. A weight ratio of anionic to nonionic emulsifier of 2.1 to 1.5 is presently preferred.

The presently preferred anionic emulsifier is sodium sulfonate of ethoxylated octyl phenol sold by Rohm & Haas under the tradename Triton X-200. Such an emulsifier contains about 20 moles of ethylene oxide per mole of ethoxylated octyl phenol. Other suitable anionic emulsifiers include alkyl polyether sulfosuccinates, alkylaryl polyether sulfosuccinates, alkylpolyether sulfonates and alkyl aryl polyether sulfonates.

The presently preferred non-ionic emulsifier is ethoxylated nonyl phenol sold by Rohm & Haas under the tradename Triton N-111. This emulsifier contains about 10 moles of ethylene oxide per mole of ethoxylated nonyl phenol. Other suitable non-ionic emulsifiers include alkyl aryl polyether alcohols.

In addition to the anionic and non-ionic emulsifiers, the gel content and particle size is preferably controlled by the inclusion of a small amount of electrolyte such as tetrasodium pyrophosphate, ammonium phosphate di- or mono-basic or the like in the emulsion. Tetrasodium pyrophosphate is presently preferred. The amount of electrolyte is preferably from about 0.15 to about 0.3 percent by weight based on the weight of the monomers. Less than about 0.15 percent by weight is not preferred because the gel content of the polymers tends to be too low. Use of more than about 0.3 percent by weight electrolyte is not preferred because it adversely affects the stability of the emulsion and the particle size tends to be high.

In addition to the various components mentioned above, the PSA composition may contain small amounts of various other fillers such as coloring agents, e.g., like carbon black, titanium dioxide, organic dyes and the like, and thickening agents.

A preferred method for preparing acrylic-based emulsion polymers of the present invention comprises first preparing a catalyst feed and a pre-emulsion feed. The catalyst feed comprises water and catalyst. Any suitable catalyst may be utilized. Sodium formaldehyde sulfoxylate is presently preferred. The pre-emulsion comprises the alkyl acrylate monomers, polar monomers, multifunctional acrylate monomers, plasticizer initiator, anionic and non-ionic emulsifiers and water.

In the method, catalyst and pre-emulsion feeds are added simultaneously to a suitable reactor. The feed rates for the catalyst and pre-emulsion feeds are adjusted so that the monomers and catalyst are added to the reactor over a period of from about 2 to about 4 hours. After about 20% to about 60%, and preferably about 40 percent of the pre-emulsion feed and catalyst feed have been added, the pH of the resulting emulsion is adjusted to about 6.3 to about 6.5 by the addition of sodium bicarbonate or the like. At this point, the protective colloid is mixed with the catalyst feed. The catalyst feed and the pre-emulsion feeds are again added simultaneously to the reactor at the desired rates preferably over a period of about 1 to about 2 hours whereby the feeds end simultaneously.

It is not presently preferred to add the protective colloid to the monomers before polymerization begins because coagulation of the particles tends to occur. It is also not preferred to add the protective colloid after all polymerization has occurred because the protective colloid tends to be non-uniformly disbursed or distributed throughout the polymer which results in a reduced initial adhesion of the polymer and lower overall performance of the adhesive.

Polymerization results in the formation of a latex having a viscosity typically in the range of from about 2500 to about 3500 centipoise. If required for the particular coating technique used, the viscosity can be increased by the addition of a thickener. A presently preferred thickener is ASE 60, a polyelectrolyte sold by Rohm & Haas.

Once the viscosity has been adjusted to the desired level, if required, the latex can be applied to label facestock or other backing material by conventional techniques such as die coating and roll coating. Coating speeds of up to about 600 feet per minute can be used. Preferred coating thicknesses are from about 15 to about 25 grams per square meter.

To enhance the anchorage of the PSA adhesive to the facestock, it is preferred to first apply a thin layer of primer coating, generally in the range of 1 to 6 grams per square meter onto the facestock. Commercially available permanent or semi-permanent pressure-sensitive adhesives or ethylene vinyl acetate polymer formulations having a peel adhesion of more than about 300N/m$^2$, are suitable as primers.

The PSA compositions of the present invention provide stable long-term adhesion on a variety of substrates. Typical adhesions are on the order of about 50 to about 300 N/m on stainless steel. The compositions exhibit good temperature resistance, maintaining stability at temperatures of up to 100° C. and preferably up to 130° C. or more, good repositionability and good mandrel performance. Mandrel performance refers to the ability of the adhesive composition to adhere to a small diameter, e.g., 0.5 to 1.0 inches.

EXAMPLE 1

To a one liter, four necked jacketed reactor equipped with thermocouple, reflux condenser, stainless steel blade stirrer and nitrogen inlet tube, were charged 90 grams of deionised water, 1.2g of tetrasodium pyrophosphate (TSPP) and 0.1g of Aerosol MA-80, an anionic surfactant sold by American Cyanamid. A monomer mix consisting of 240 g of 2-ethylhexyl acrylate, 152 g of butyl acrylate, 8 g of methacrylic acid, 8 g of dioctyl azelate, 0.8 g of hexane diol diacrylate and 0.4 g of t-butyl hydroperoxide was added to 130 g of water containing 30 g of Triton X-200 and 6 g of Triton N-111 and was agitated for sufficient time until the formation of a stable pre-emulsion feed. To the reactor charge was added 29 g of the above pre-emulsion and the contents of the flask were agitated while purging nitrogen for 15-20 minutes and then heated to 40° C. At 40° C. a solution of the initiator containing 0.2 g of potassium persulfate, 0.03 g of FeEDTA in 6 g of water was added. After about two minutes, 1.6 g of a catalyst feed solution prepared by adding 0.4 g of sodium formaldehyde sulfoxylate to 80 g of water was added. After about 4 minutes when the peak exotherm was observed, the preemulsion feed and the catalyst B were added at rates of 1.5 g and 0.47 g/min respectively. After 10 minutes the pre-emulsion feed rate was increased to 3 g/min. A second catalyst feed solution was prepared by adding 30 g of a 10% solution of Vinol 540 to 40% of the first catalyst. After about 60% of the monomer feed was in, the second catalyst feed was added at a rate of 1 g/min. Simultaneously, a solution of 1g of sodium bicarbonate in 12 g of water was added dropwise over a period of 10-15 minutes. The rate of agitation was increased from time to time to ensure proper mixing. When all the feeds were in, the temperature was raised to 60° C. and maintained for 0.5 hr. The composition was then cooled and filtered through 100 mesh nylon sieve. The resulting composition had a solids content of 54%, a percent congulum of less than 0.01% and a viscosity of about 3600 centipoise as measured by a Brookfield viscometer.

EXAMPLE 2

Example No. 1 was repeated with the following changes. No polyvinyl alcohol, i.e., Vinol 540 was added in the later part of the catalyst feed. The kettle charge had 120 g of water and 1.2 g of TSPP. The catalyst feed had 100 g of water. The resulting composition had a solids content of 51.4%, less than 0.01% coagulum and a viscosity of 300 centipoise.

EXAMPLE 3

Example No. 1 was repeated with the exception that the monomer mix contained no dioctyl azelate and the kettle charge was the same as in Example 2. The resulting composition had a solids content of 51% less than 0.01% coagulum and a viscosity of 2700 centipoise.

EXAMPLE 4

Example 1 was repeated with the exception that no polyvinyl alcohol (Vinol 540) or dioctyl azelate was added.

EXAMPLE 5

To the same setup as in Example 1 were added 90 g of water, 1.2 g of TSPP, 0.04 g of FeEDTA and 0.4 g of MA-80 an anionic surfactant sold by American Cyanamid. A monomer pre-emulsion feed was made, by dissolving 30 g of Triton X-200 in 150 g of water and adding to it with agitation a slow stream of monomer mix consisting of 240 g of 2-ethylhexyl acrylate, 152 g of butyl acrylate, 8 g of methacrylic acid, 0.8 g of hexanediol diacrylate and 0.8 g of t-butyl hydroperoxide. After agitating for 0.5 hr., 29 g of the pre-emulsion feed was added to the reactor charge and was heated to 40° C. At this temperature, 2 g of catalyst feed prepared by dissolving 0.64 g of sodium formaldehyde sulfoxylate in 75 g of water was added. When the temperature increased to 45° C. the pre-emulsion and catalyst feeds were added over a period of 3 hrs. ensuring proper mixing. At the end of feeds, the temperature was raised to 60° C., maintained for 0.5 hr. and cooled. The composition was filtered through 100 mesh nylon sieve. The composition had a solids content of 55%, and less than 0.01% coagulum.

EXAMPLE 6

Example 1 was repeated with 0.4 g. of hexanediol diacrylate and with a constant feed rate of the preemulsion for three hours. The resulting composition had a solids constant of 54%.

EXAMPLE 7

Example 1 was repeated with 0.2 g of t-butyl hydroperoxide, 1.0 g of hexanediol diacrylate and 4 g of methacrylic acid in the pre-emulsion feed. The catalyst feed had 0.2 g of sodium formaldehyde sulfoxylate in total. The catalyst feed was added at a rate of 0.67 g/min. after the addition of 40% of the preemulsion feed.

EXAMPLE 8

The removability of the compositions of Examples 1-7 were determining by measuring the 90° peel adhesion values initially and at regular intervals for a period of up to 2 weeks at ambient conditions and at one week at 50° C.

High gloss paper facestock was first coated with a primer of formulated Airflex 400 (an ethylene vinyl acetate polymer sold by Air Products) containing fillers to improve coatability and anchorage, to a coat weight of 1.5-3 g/m². The compositions of Examples 1-7 were coated onto a silicone release liner to a coat weight of 15-25 g/m₂ and dried for 10 minutes at 70° C. The adhesive compositions were then transferred to the primed facestock. Standard sample sizes were cut and tested for 90° peel adhesion on appliance enamel according to PSTC No. 2, Fifth Edition, utilizing a 20 minute dwell. The results of the tests are shown below in Table 1.

TABLE 1

| SAMPLE | % GEL | COAT WT. g/m₂ | INITIAL | ADHESION 24 HR. | 1 WK. 50° C. | 2 WK RM. TEMP. |
|---|---|---|---|---|---|---|
| Ex. 1 | 79 | 18 | 160 cl | 180 cl | 200 cl | 140 Cl |
| Ex. 2 | 75 | 17 | 190 cl | 210 cl | 250 cl | |
| Ex. 3 | 78 | 18 | | 160 cl | 280 cl | |
| Ex. 4 | 76 | 18-20 | 165 | | 300 spt | |
| Ex. 5 | 83 | 20-22 | 250 cl | | 325 spt | 450 pt |
| Ex. 6 | 65 | 18-20 | | | | 256 spt | cl = clean removal
pt = paper tare
spt = slight paper tare

EXAMPLE 9

The removability of the compositions of Examples 1 and 3 were determined on various substrates. The procedure followed was the same as set forth in Example 8. The results are shown in Table 2 below.

TABLE 2

| SAMPLE | FACE STOCK | AGING | ADHESION (N/M²) POLYETHYLENE | POLYPROPYLENE | FIBERGLASS | APPLIANCE ENAMEL |
|---|---|---|---|---|---|---|
| Ex. 1 | High Gloss Paper | Initial | 123 cl | 123 cl | 105 cl | 105 cl |
| Ex. 1 | High Gloss Paper | 1 week | 140 cl | 140 cl | 123 cl | 140 cl |
| Ex. 1 | High Gloss Paper | 4 weeks | 140 cl | 140 cl | 123 cl | 123 cl |
| Ex. 1 | High Gloss Paper | 8 weeks | 105 cl | 105 cl | 123 cl | 105 cl |
| Ex. 1 | High Gloss Paper | 12 weeks | 88 cl | 175 cl | 123 cl | 140 cl |
| Ex. 1 | EDP | Initial | 88 cl | 140 cl | 123 cl | 123 cl |
| Ex. 1 | EDP | 1 week | 88 cl | 158 cl | 88 cl | 140 cl |
| Ex. 1 | EDP | 4 weeks | 70 cl | 140 cl | 123 cl | 140 cl |
| Ex. 1 | EDP | 8 weeks | 70 cl | 140 cl | 105 cl | 140 cl |
| Ex. 1 | EDP | 12 weeks | 88 cl | 175 cl | 140 cl | 157 cl |
| Ex. 3 | High Gloss Paper | Initial | 70 cl | — | 130 cl | 150 cl |
| Ex. 3 | High Gloss Paper | 1 week at 50° C. | 67 cl | — | 188 cl | 275 pt |

| SAMPLE | RECYCLED CORROGATED | GLASS | FORMICA | MANILA TAG | PAPER ENVELOPES |
|---|---|---|---|---|---|
| Ex. 1 | 53 cl | 53 cl | 105 cl | 70 cl | 53 cl |
| Ex. 1 | 88 cl | 53 cl | 140 cl | 123 cl | 105 cl |
| Ex. 1 | 53 cl | 70 cl | 140 cl | 105 cl | 53 cl |
| Ex. 1 | 53 cl | 70 cl | 158 cl | 123 cl | 70 cl |
| Ex. 1 | 70 cl | 88 cl | 175 cl | 123 cl | 88 cl |
| Ex. 1 | 53 cl | 53 cl | 140 cl | 105 cl | 70 cl |
| Ex. 1 | 88 vsl | 53 cl | 140 cl | 105 cl | 88 cl |
| Ex. 1 | 53 vsl | 53 cl | 140 cl | 105 cl | 53 cl |
| Ex. 1 | 70 cl | 105 cl | 175 cl | 123 cl | 70 cl |
| Ex. 1 | 70 cl | 105 cl | 157 cl | 123 cl vsl | 123 cl |
| Ex. 3 | 95 sfp | 100 cl | 130 cl | 95 cl | 90 cl |
| Ex. 3 | 105 cl | 110 cl | 172 cl | 140 cl | 110 cl | cl = clean removal
pt = paper tare
vsl = very slight legginess
sfp = slight fiber pick (picks up fibers of cardboard)

The above description has been presented with reference to preferred compositions and preparatory methods. Workers skilled in the art and technology to which this invention pertains will appreciate that alterations and changes in the described compositions and method can be practiced without meaningfully departing from the principles, spirit and scope of this invention.

Accordingly, the foregoing description should not be read as pertaining only to the precise compositions and procedures described, but rather should be read consistent with and as support for the following claims which are to have their fullest fair scope.

What is claimed is:

1. An emulsion polymer having a gel content of from about 70% to about 90%, said emulsion polymer comprising:
   a. from about 90 to about 99.5 parts of at least one alkyl acrylate monomer having from one to about twelve carbon atoms in the alkyl chain;

b. a positive amount of up to about 2 parts of at least one polar monomer; and c. a positive amount of up to about 1 part of at least one multifunctional acrylate monomer.

2. An emulsion polymer as claimed in claim 1 having a gel content of from about 75% to about 83%.

3. An emulsion polymer as claimed in claim 1 comprising about 98 parts alkyl acrylate monomers.

4. An emulsion polymer as claimed in claim 1 wherein at least most of the alkyl acrylate monomers comprise from about 4 to about 8 carbon atoms in the alkyl chain.

5. An emulsion polymer as claimed in claim 1 comprising about 2 parts of a polar monomer.

6. An emulsion polymer as claimed in claim 1 comprising from about 0.1 to about 0.3 parts multifunctional acrylate monomer.

7. An emulsion polymer as claimed in claim 1 comprising a swell ratio of from about 15 to about 25.

8. An emulsion polymer as claimed in claim 7 comprising a swell ratio of from about 18 to about 23.

9. An emulsion polymer as claimed in claim 1 comprising a glass-transition temperature of from about $-30°$ C. to about $-60$ C.

10. An emulsion polymer as claimed in claim 9 comprising a glass-transition temperature of from about $-50°$ C. to about $-55°$ C.

11. An emulsion polymer as claimed in claim 1, wherein the multifunctional acrylate monomer is selected from the group consisting of polyethylene glycol diacrylate, hexane diol diacrylate, ethoxylated trimethylpropane triacrylate, pentaerythritol triacylate and polypropylene glycol diacrylate.

* * * * *

UNITED STATES PATENT AND TRADEMARK OFFICE
CERTIFICATE OF CORRECTION

PATENT NO. : 4,925,908

DATED : May 15, 1990

INVENTOR(S) : Margaret Bernard; Stansliv Berman

It is certified that error appears in the above-identified patent and that said Letters Patent is hereby corrected as shown below:

On the title page:

ABSTRACT, line 3, after "90%" change "comprises" to -- comprising --.

Column 1, line 26, change "20g/m$^2$" to -- 20 g/m$^2$ --.
Column 1, line 36, change "crosslinkering" to -- cross-linkering --.
Column 2, line 45, change "aklyl" to -- alkyl --.
Column 3, line 27, change "preferrably" to -- preferably --.
Column 4, lines 6,9, change "crosslinking" to -- cross-linking -- (both occurrences).
Column 4, line 12, change "glasstransition" to -- glass-transition --.
Column 4, line 44, before "percent" insert -- 3 --.
Column 7, line 17, change "300N/m$^2$" to -- 300 N/m$^2$ --.
Column 7, line 34, change "1.2g" to -- 1.2 g --.
Column 7, line 35, change "0.1g" to -- 0.1 g --.
Column 7, line 53, change "preemulsion" to -- pre-emulsion --.
Column 7, line 60, change "1g" to -- 1 g --.
Column 7, line 68, change "congulum" to -- coagulum --.

UNITED STATES PATENT AND TRADEMARK OFFICE
CERTIFICATE OF CORRECTION

PATENT NO. : 4,925,908

DATED : May 15, 1990

INVENTOR(S) : Margaret Bernard; Stansliv Berman

It is certified that error appears in the above-identified patent and that said Letters Patent is hereby corrected as shown below:

Column 8, line 50, change "0.4 g." to -- 0.4 g --.
Column 8, line 51, change "preemulsion" to
    -- pre-emulsion --.
Column 8, line 61, change "preemulsion" to
    -- pre-emulsion --.
Column 8, line 65, change "determining" to -- determined --.
Column 9, line 7, change "15-25 g/m$_2$" to -- 15-25 g/m$^2$ --.
Column 9, line 10, change "90 °" to -- 90° --.

Column 12, line 7, change "-60C." to -- -60°C. --.

Signed and Sealed this

Twenty-ninth Day of March, 1994

BRUCE LEHMAN

*Attest:*

*Attesting Officer*     *Commissioner of Patents and Trademarks*